United States Patent [19]

Weaver

[11] Patent Number: 5,768,860
[45] Date of Patent: Jun. 23, 1998

[54] ROUND PRODUCT DIVIDER FOR PACKAGING LINE

[75] Inventor: J. Michael Weaver, Madison, Conn.

[73] Assignee: Standard-Knapp, Inc., Portland, Conn.

[21] Appl. No.: 745,926

[22] Filed: Nov. 7, 1996

[51] Int. Cl.⁶ .................................................. B65B 35/30
[52] U.S. Cl. .............................. 53/543; 53/493; 198/444; 198/445
[58] Field of Search .................................... 198/444, 445, 198/446; 53/493, 494, 495, 543

[56] References Cited

U.S. PATENT DOCUMENTS

| | | | |
|---|---|---|---|
| 4,173,276 | 11/1979 | Raudat et al. | 198/444 X |
| 4,236,625 | 12/1980 | Smith et al. | 198/446 X |
| 4,276,977 | 7/1981 | van Kattenbroek | 198/446 |
| 4,844,234 | 7/1989 | Born et al. | 198/444 X |
| 4,880,104 | 11/1989 | Evans et al. | 198/445 |
| 4,966,272 | 10/1990 | Raudat | 198/446 |
| 5,515,668 | 5/1996 | Hunt et al. | 53/543 |

*Primary Examiner*—Daniel Moon
*Attorney, Agent, or Firm*—McCormick, Paulding & Huber

[57] ABSTRACT

Round bottles are moved between side walls in a tightly packed configuration by an underlying conveyor in a packaging line that requires the bottles to be divided into a plurality of side-by-side lanes for entry into the packer. The divider has selectively movable panels that normally form a divergent funnel for the bottles to allow them to expand and to move into the lanes. Void detectors in each of the outside lanes provide a signal to move one or both panels outwardly to clear a jam of bottles in the funnel. After a delay, the panels return slowly to their normal positions where they remain until the void detectors signal another jam in the funnel.

18 Claims, 3 Drawing Sheets

ROUND PRODUCT DIVIDER FOR PACKAGING LINE

BACKGROUND OF THE INVENTION

This invention relates generally to creating discrete columns of articles for entry into a packer from a nested supply of round articles moving downstream between fixed lane guides in a nested configuration. More particularly, the present invention relates to an improved divider structure capable of selective operation to clear a jam of the articles in the divider automatically upon detection of a void in one or more of the lanes associated with forming each of the columns of articles for entry into the packer.

Prior art lane dividers have taken many forms, some of which include the provision for oscillating lane guides provided between the nested supply of articles and the individual lane defining structure itself. See U.S. Pat. No. 4,966,272 to Raudat for an example of such a divider.

The primary aim of the present invention is to provide an article divider configuration which need be operated only as required, and which provides for more efficient handling of the articles as they move from the nested configuration to individual columns within the various lanes.

Another object of the present invention is to provide an adjustable lane guide divider structure to accommodate different numbers of lanes, and so as to accommodate round product of different diameter.

SUMMARY OF THE INVENTION

In accordance with the present invention, the upstream ends of the structure defining the various lanes has the innermost lane guides extending farther upstream than the outermost lane guides. In further accordance with the present invention, movable lane guide panels normally form a divergent passageway for the articles to encourage expansion of the articles from their nested configuration into a plurality of columns for entry into the various lanes.

The divergent divider sidewalls are defined by movable article guiding panels, and the panels have normal positions such the downstream ends thereof are normally aligned with the outer lane guides associated with the lane defining structure. The upstream ends of these panels are normally aligned with the fixed upstream side walls whereby a divergent funnel shape is provided for the articles. Additional space is provided for the nested articles to expand laterally for entry into the lanes as a result of moving these panels outwardly in an abrupt fashion to relieve article jamming.

Article void detectors provide void signals in response to gaps in the columns of articles in at least the outside lanes, and means is provided for moving these article guiding panels outwardly into a "clear" position and maintaining the panels in this "clear" position for a predetermined dwell period before the panels are more slowly returned to their normal positions. Further, the panels are preferably movable independently of one another so that void signals generated on one or the other side of the lane defining structure can operate its associated panel independently of the other panel.

Finally, these lane guiding panels are preferably of stepped construction such that lands are provided on the panels, the lands being parallel to one another and to the general alignment of the lane guides themselves when the panels are in their normal positions, and such that divergent wall segments of the panels provided between these lands can be oriented at an acute angle (45°–60°) with respect to the upstream ends of the innermost lane guides. This geometry has been found to be advantageous in clearing jams of articles that sometimes occur in the divider with the movable panels in their normal positions.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings.

DESCRIPTION OF THE PREFERRED EMBODIMENT

Figure 1:
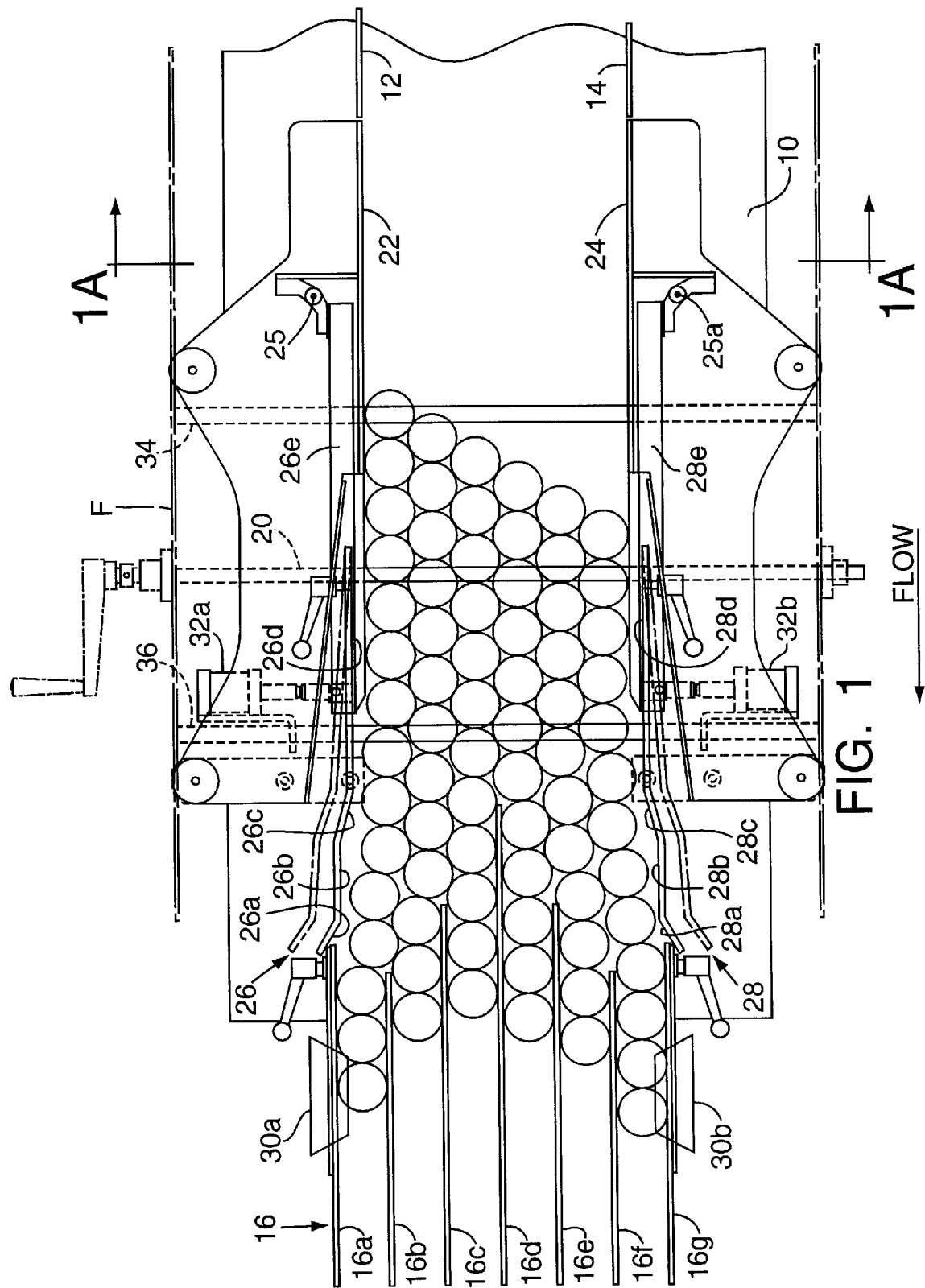
FIG. 1 shows a top plan view of a round product divider constructed in accordance with the present invention, portions of the structure being broken away and portions illustrated in phantom or broken lines to better illustrate the features of the divider.
Figure 1A:
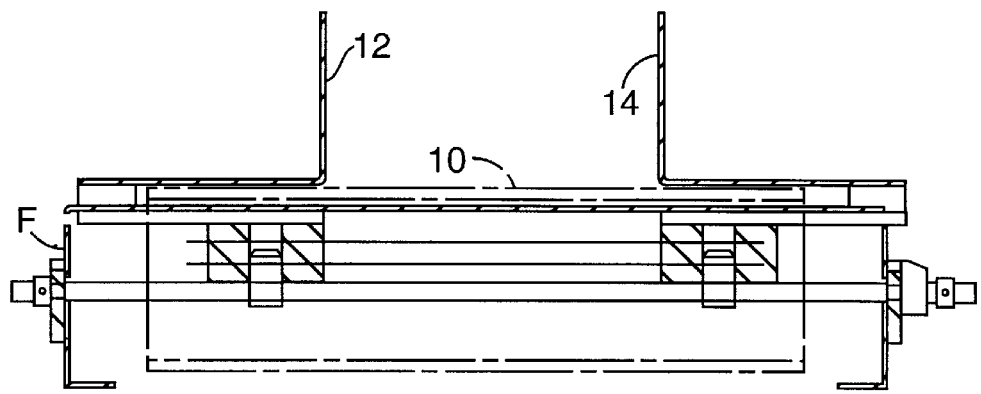
FIG. 1A is a cross-sectional view taken generally on the line 1A, 1A of FIG. 1.
Figure 5:
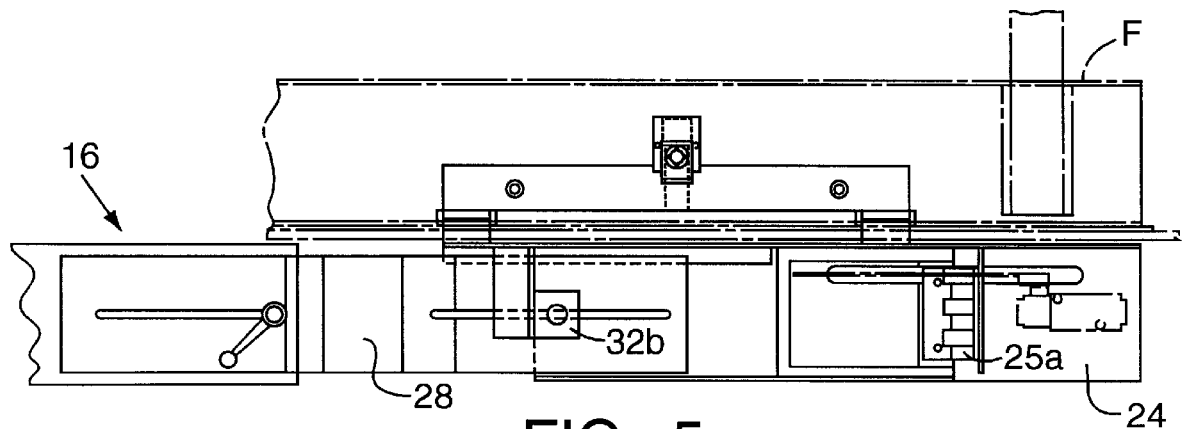
FIG. 5 is an elevational view showing one side of the apparatus of FIG. 1.

In a typical packaging line, a supply of nested product, in the form of round bottles, is conveyed downstream in the direction of the arrow of FIG. 1 on an underlying conveyor 10 and between spaced side walls 12 and 14.

A packer (not shown) is provided at a downstream location. The packer must receive the articles in orderly columns, preferably between parallel lane guides as suggested generally at 16 in FIG. 1.

The present invention relates to the round product divider structure provided between the nested supply of articles and the plurality of lanes through which the various columns of articles are fed to the packer.

In accordance with conventional technology, the width of the various lane guides, indicated generally at 16, can be varied to accommodate articles of different diameter. Further, certain of these guides can be eliminated so that the number of lanes can be decreased or increased from that shown in FIG. 1. See FIGS. 2, 3 and 4 for example. Furthermore, the inflow lane guides or side walls 12 and 14 are also adjustable by conventional means (not shown) for much the same reason. Again, see FIGS. 2, 3 and 4.

In accordance with the present invention, the divider structure accommodates a different number of lanes of articles, as well as articles of different diameter. A lead screw is mounted in the fixed frame of the machine so that the opposed frames 22 and 24 can be moved toward or away from one another. These frames 22 and 24 define upstream portions which are aligned with the downstream ends of the side walls 12 and 14 referred to previously.

In further accordance with the present invention, each of these frames 22 and 24 defines a pivot, which pivots are indicated generally at 25 and 25a respectively so that generally divergent article guiding panels 26 and 28 can be moved from the positions shown (normal positions) to "clear" positions wherein they are outwardly spaced from one another by a greater distance than that shown in solid lines in FIG. 1. This pivotal motion is accomplished at a pivot point well upstream of the actual path of travel for these panels providing an essentially parallel motion for the panels themselves. It is also an important feature of the present invention that each of the panels is independently movable in response to the output signal from a void detector such as that indicated generally at 30A and 39B. Further, the motion of these panels is preferably abrupt and responds to an output signal from the void detector so as to clear any jam in an expedited fashion. After a predetermined dwell period in the open position, the panel or panels are returned to their normal positions shown. The actuator cylinders 32a and 32b are provided for slowly returning the movable panels, and each air cylinder is preferably air driven in the direction for abrupt opening movement, and spring loaded to return from the "clear" position to this normal position by providing a flow restriction in the line returning the air from the cylinder to the reservoir (not shown). In the presently preferred form of the invention, each cylinder is independently operated from its associated void detector.

Slide rails 34 and 36 are provided in the machine frame F so as to provide slidable supports for the limited lateral adjusting movement of the frames 22 and 24 when accommodating articles of different diameter or a different number of lanes for a particular packing line installation.

Turning next to a more complete description of the moveable panels 26 and 28, when considered in connection with the upstream ends of the various lane dividers 16a–16g, each panel includes at least two stepped lands and at least two offset or divergent wall segments, one of which divergent wall segments interconnects the stepped lands to the divergent wall segments and defines a downstream end portion of the panel. The latter divergent section is indicated generally at 26a, the adjacent land is indicated at 26b, the next divergent section being indicated generally at 26c. Finally, another divergent section is provided on the fixed frame itself being indicated generally at 26d. The opposite panel 28 is similarly configured and has an axially symmetric configuration as compared to the panel 26 relating to the direction of the flow of articles downstream.

Still with reference to the movable portions of these panels, each panel also includes an inner portion that normally comprises a continuation of the spaced side walls 12 and 14 as well as being aligned with the spaced frame wall portions 23 and 24 discussed previously. The divergent wall section 26d associated with the panel 26 is actually defined on this inner portion of the panel. It is an important feature of the present invention that the stepped or divergent portion of the panel 26 is longitudinally adjustable with respect to the inner portion 26e. This adjustability when considered in conjunction with the adjustability of the longitudinal location of the upstream end of the lane guides 16a allows the lane guides to be adjusted to accommodate articles of different diameter or to accommodate a different number of lanes in a particular packing line installation.

It should be noted that the divergent wall segments of the panels 26 and 28, as well as the short segments 26d and 28d associated with the inner portions of these panels are each angularly related to inner ones of the lane guides. For example, the innermost guide 16c has its upstream end oriented at an angle of 45° with respect to the divergent wall segments 26a and 28a. By the same token, the divergent wall portions 26c and 28d provided between the adjacent parallel lands of the panel cooperate to define an angle with the upstream ends of the lane guides 16c and 16d, respectively of approximately 45°.

Figure 2:
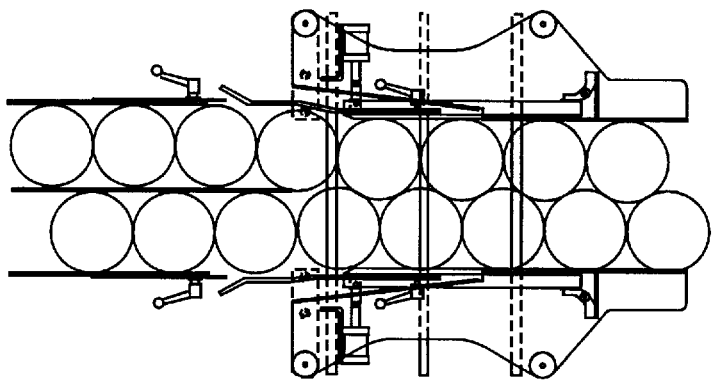
FIG. 2 shows the structure of FIG. 1 set up for handling a different number of columns of articles and the articles being of different diameter.
Figure 3:
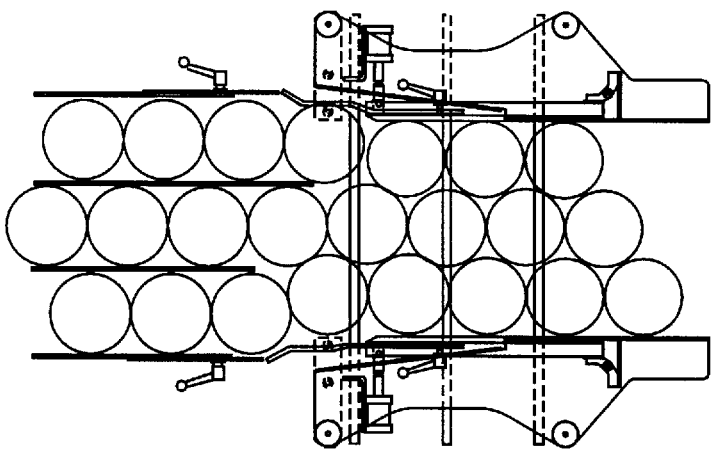
FIG. 3 shows the apparatus of FIGS. 1 and 2 set up for handling still another number of columns of still different diameter.
Figure 4:
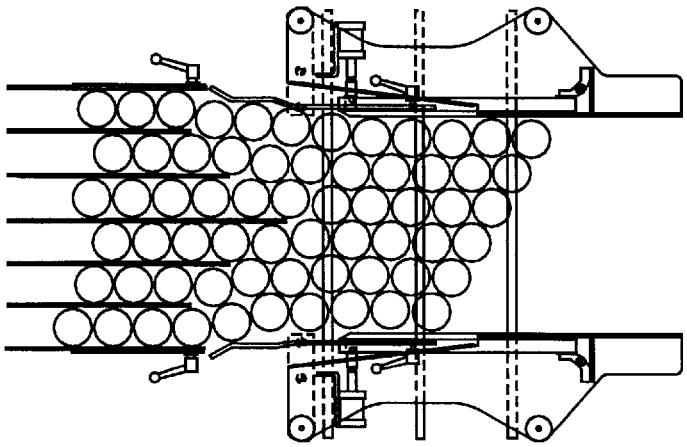
FIG. 4 is a plan view similar to FIGS. 1, 2 and 3, but set up for accommodating articles of still different diameter in still another number of lanes.

Finally, the same is true of the upstream ends of the lane guides 16b and 16e. The divergent end wall segment of the panels 26 and 28 are oriented at approximately 45° with respect to these upstream end portions. It is important that these relationships be preserved even when the entire structure is adjusted for accommodating a different number of lanes or columns or articles and/or different diameter of product. It is this requirement that leads to the necessity for the adjustability, longitudinally, of the movable panel portions as described previously. See for example, the geometry for these components as illustrated in FIGS. 2, 3 and 4.

I claim:

1. In a packaging line having a supply of cylindrically shaped articles provided on a continuously moving conveyor between fixed upstream side walls that are spaced apart to accommodate a tightly packed stream of nested articles that are to be divided into discrete columns for acceptance by a packer, the improvement comprising:

discrete lane defining means including outer lane guides and inner lane guides, defining a plurality of lanes for the articles to move in columns, movable article guiding panels defining a divergent funnel for the articles entering discrete lanes from the nested supply of articles, said panels having normal positions such that downstream ends thereof are normally aligned with said outer lane guides and having upstream ends that are normally aligned generally with the fixed upstream side walls thereby defining a divergent funnel for the articles to provide space for the nested articles to expand laterally for entry into said lanes, at least one article void detector providing a void signal in response to a gap in a column of articles in one of said lanes, means for moving said article guiding panels outwardly into "clear" positions and maintaining said "clear" positions for a predetermined dwell period before said panels are returned to said normal positions in response to said void signal, and said movable article guiding panels having downstream end portions that are longitudinally adjustable to accommodate articles of different diameter, and both odd and even numbered article columns in said lane defining means.

2. The combination of claim 1, wherein said inner lane guides have their upstream ends extending upstream beyond said downstream ends of said panels and also beyond said upstream ends of said outer lane guides.

3. The combination of claim 1, wherein said outer lane guides have longitudinally adjustable end portions that define said upstream ends thereof to provide alignment thereof within said longitudinally adjustable article guiding panel downstream end portions.

4. The combination of claim 1, wherein said means for moving said article guiding panels outwardly occurs at a predetermined speed in response to said void signal, and wherein movement of said article guiding panels from said clear position to said normal position after said predetermined delay occurs at a speed slower than said predetermined speed.

5. The combination of claim 1, wherein said panels include stepped lands, each said panels also having divergent wall segments, one of which interconnects said stepped lands, and another of which divergent wall segments defines said downstream end portion thereof.

6. The combination of claim 5, further characterized by fixed frame means movably supporting said movable panels, each said panels including wall portions aligned with said downstream ends of said upstream side walls.

7. The combination of claim 6, wherein each of said wall portions of said panels defines a divergent wall segment that is upstream of said inner lane guides and angularly related to the innermost lane guide(s) upstream end(s) to define an acute angle of approximately 45°–60° as measured with respect to the downstream direction as defined by said lane guides generally.

8. In a packaging line having a supply of cylindrically shaped articles provided on a continuously moving conveyor between fixed upstream side walls that are spaced apart to accommodate a tightly packed stream of nested articles that are to be divided into discrete columns for acceptance by a packer, the improvement comprising:

discrete lane defining means including outer lane guides and inner lane guides, defining a plurality of lanes for the articles to move in columns, movable article guiding panels defining a divergent funnel for the articles entering discrete lanes from the nested supply of articles, said panels having normal positions such that downstream ends thereof are normally aligned with said outer lane guides and having upstream ends that are normally aligned generally with the fixed upstream side walls thereby defining a divergent funnel for the articles to provide space for the nested articles to expand laterally for entry into said lanes, at least one article void detector providing a void signal in response to a gap in a column of articles in one of said lanes, and said article guiding panels being movable independently of one another, and wherein at least two such article void detectors are provided in association with both outside lanes of said lane defining means, and means for selectively moving each of said panels in response to each void signal from each said article void detector.

9. The combination of claim 8, wherein said outer lane guides have longitudinally adjustable end portions that define said upstream ends thereof, and said panels having downstream end portions that are also longitudinally adjustable to provide for said alignment as said lane guides are laterally adjusted to accommodate articles of different diameter.

10. The combination of claim 9, wherein said inner lane guides have their upstream ends extending upstream beyond said downstream ends of said panels and also beyond said upstream ends of said outer lane guides.

11. The combination of claim 10, wherein said outer lane guides have longitudinally adjustable end portions that define said upstream ends thereof, and said panels having downstream end portions that are also longitudinally adjustable to provide for said alignment as said lane guides are laterally adjusted to accommodate articles of different diameter.

12. The combination of claim 11, wherein said panels include stepped lands, each said panels also having divergent wall segments, one of which interconnects said stepped lands, and another of which divergent wall segments defines said downstream end portion thereof.

13. The combination of claim 12, further characterized by fixed frame means movably supporting said movable panels, each said panels including wall portions aligned with said downstream ends of said upstream side walls.

14. The combination of claim 13, wherein each of said wall portions of said panels defines a divergent wall segment that is upstream of said inner lane guides and angularly related to the innermost lane guide(s) upstream end(s) to define an acute angle of approximately 45°–60° as measured with respect to the downstream direction as defined by said lane guides generally.

15. The combination of claim 8, wherein said means for selectively moving said article guiding panels moves said article guide panels outwardly at a predetermined speed in response to said void signal, and wherein movement of said article guiding panels from outward positions to said normal positions after a predetermined delay occurs at a speed slower than said predetermined speed.

16. The combination of claim 15, wherein said outer lane guides have longitudinally adjustable end portions that define said upstream ends thereof, and said panels having downstream end portions that are also longitudinally adjustable to provide for said alignment as said lane guides are laterally adjusted to accommodate articles of different diameter.

17. The combination of claim 16, wherein said panels include stepped lands, each said panels also having divergent wall segments, one of which interconnects said stepped lands, and another of which divergent wall segments defines said downstream end portion thereof.

18. The combination of claim 17, further characterized by fixed frame means movably supporting said movable panels, each of said panels including wall portions aligned with said downstream ends of said upstream side walls.

* * * * *